United States Patent [19]

Tandai et al.

[11] Patent Number: 5,033,184
[45] Date of Patent: Jul. 23, 1991

[54] METHOD OF MANUFACTURING MAGNETIC HEAD

[75] Inventors: Takahiko Tandai; Masahisa Tazawa, both of Aomori, Japan

[73] Assignees: Nakamichi Corporation, Tokyo; Nakamichi Fukushima Corporation, Fukushima, both of Japan

[21] Appl. No.: 533,426

[22] Filed: Jun. 5, 1990

[30] Foreign Application Priority Data

Jun. 6, 1989 [JP] Japan ................................. 1-144838
Jun. 6, 1989 [JP] Japan ................................. 1-144839

[51] Int. Cl.⁵ .............................................. G11B 5/42
[52] U.S. Cl. .................................... 29/603; 360/103
[58] Field of Search .................. 29/603; 360/102, 103, 360/125–127

[56] References Cited

U.S. PATENT DOCUMENTS 4,160,315  7/1979  Tandon et al. ...................... 29/603
4,897,915  2/1990  Ito ........................................ 29/603

*Primary Examiner*—Carl E. Hall
*Attorney, Agent, or Firm*—Dann, Dorfman, Herrell and Skillman

[57] ABSTRACT

A pair of half core blocks, one of which is provided with a groove for providing a prescribed gap depth in a magnetic head, are bonded together to produce a ring core. The ring core is inserted into a slot formed in a top of a magnetic slider and secured in position which provides a precise flush relation between a base end of a half core provided with a groove and the top of the slider. The slider is ground from its bottom to expose the end of the ring core inserted into the slot to produce a head assembly. One side of the ring core portrudes from the slider in the head assembly. When one or more of the head assemblies are mounted on a base block, the protruding side is maintained in contact with a reference upstanding plane provided by a jig for definite positioning of the head assemblies so that gaps in the respective ring cores extends exactly in a running direction of a magnetic tape, thereby preventing azimuth loss.

5 Claims, 17 Drawing Sheets

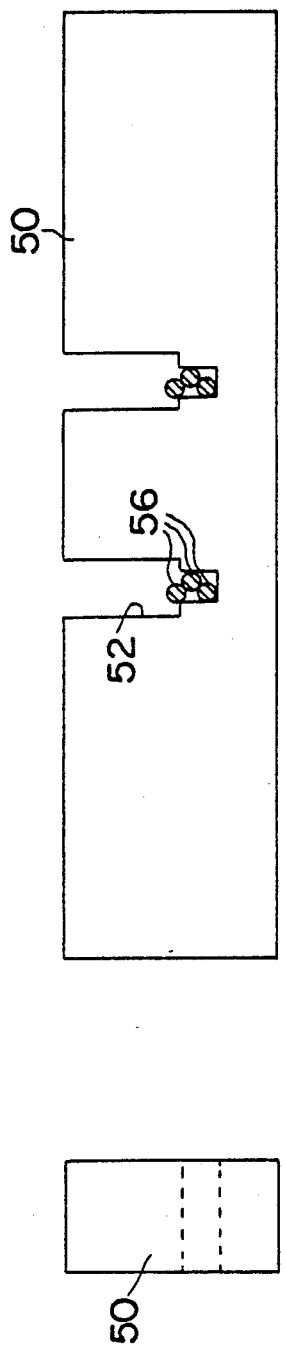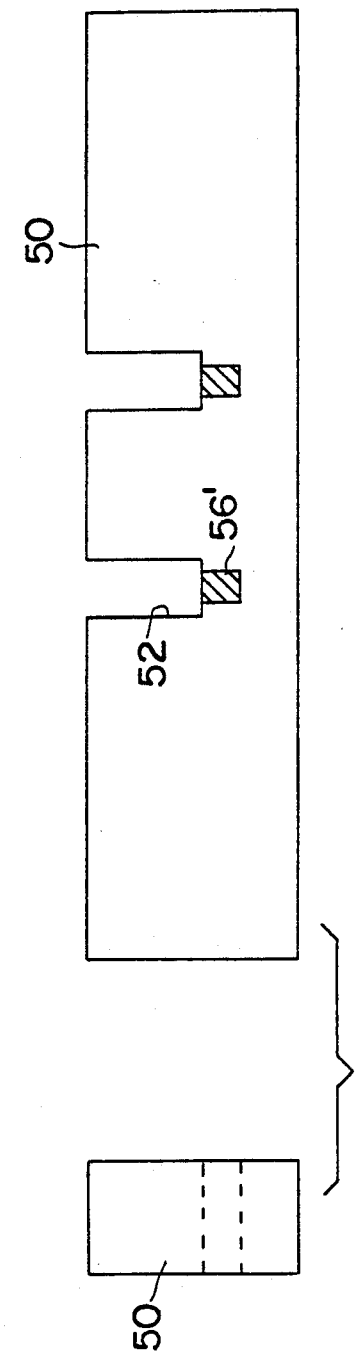
FIG.4(d)
FIG.4(e)

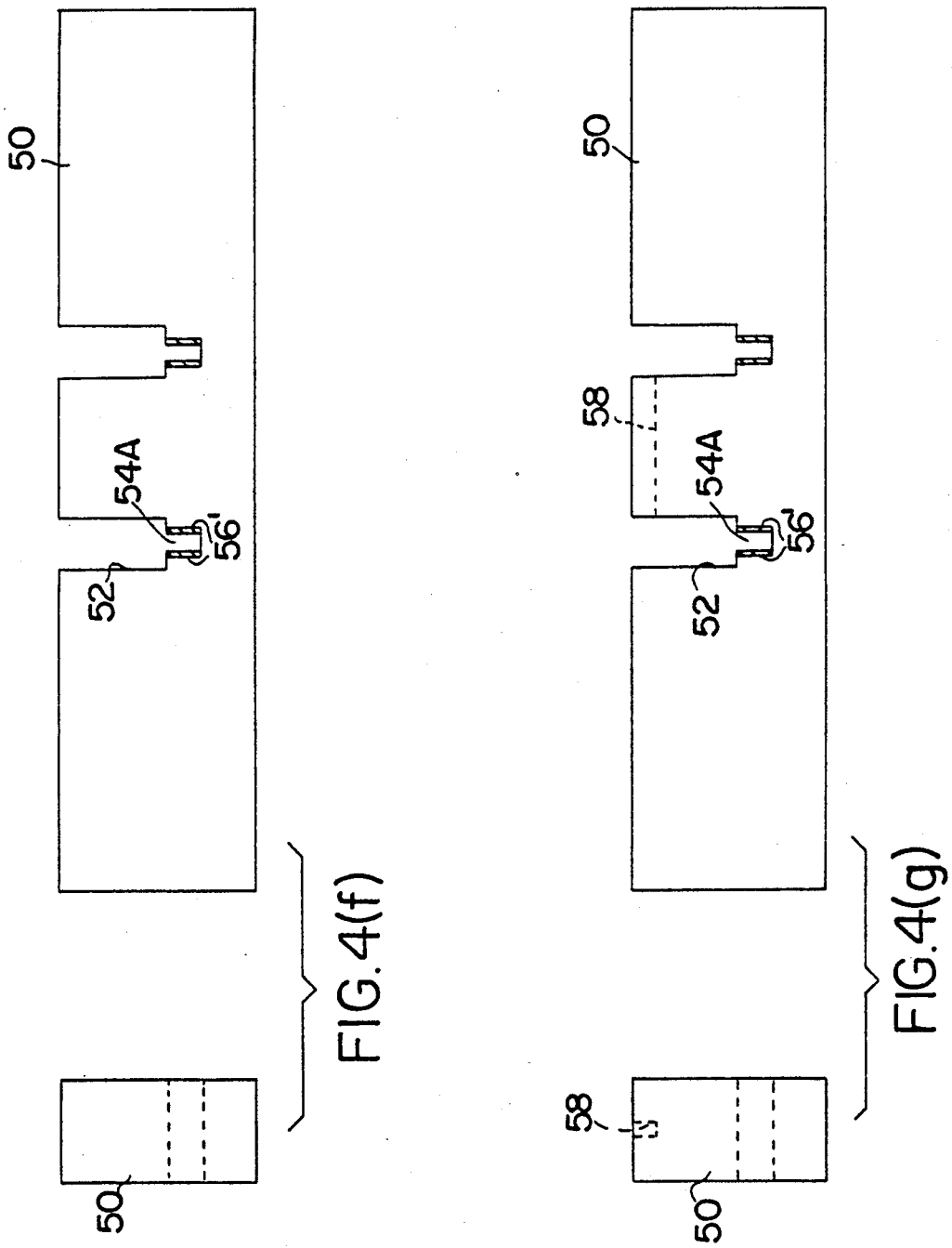

METHOD OF MANUFACTURING MAGNETIC HEAD

BACKGROUND OF THE INVENTION

This invention relates to a method of manufacturing a magnetic head to be used in various recording/reproducing instruments such as cassette tape recorders and video tape recorders and streamers associated with a computer for preventing accidental erasure of data stored in a hard disc unit of the computer.

Japanese Patent Publication No. (Sho) 51-44648 discloses a process for manufacturing the magnetic head comprising the steps of preparing a magnetic ring core element consisting of a pair of half bodies and providing a prescribed gap, and inserting and securing the ring core element in a slot formed in a parallelepiped block or slider of magnetic material. Into the slot is inserted a glass rod which is then melted and solidified so that the slot is filled with the glass material. The glass material in the slot is formed to form a groove of a width identical to a thickness of the magnetic core element and a depth greater than the slot. The core element is fitted into the groove and fixedly positioned by remelting and resolidifying the glass material. The slider is ground from the bottom side to expose the inserting end of the core element, thereby producing a head assembly. The head assembly may simply be used as a magnetic head. In other embodiments, one or more of the head assemblies are mounted in position on a base block to produce a composite magnetic head. The head assembly may include two or more of ring core elements fitted in slots or grooves extending in parallel in the slider.

According to this prior art, if the core element should be prepared with displacement in height with respect to the two half bodies, it would become difficult for the core element to be definitely positioned in the slot in the slider. If the base end of the core element fitted in the slider could not be maintained flush with the top side of the slider, a prescribed gap depth in the magnetic head would be impared, resulting in deterioration of characteristics of the magnetic head.

When producing the composite magnetic head, plural head assemblies are placed and secured on the base block with a jig providing a reference plane to be in contact with the side surface of the slider. This requires high working accuracy on the side surface of the slider, which will inevitably and considerably increase a manufacturing cost of the composite magnetic head. In case of degraded working accuracy on the side surface, the gaps in the ring cores in the respective head assemblies would not be aligned in parallel, which may cause azimuth loss. The above can also be said when a single head assembly is to be mounted in position on the base block.

SUMMARY OF THE INVENTION

It is therefore an object of the invention to eliminate disadvantages and defects encountered in the prior art in magnetic head manufacturing.

Another object of the invention is to provide a method capable of manufacturing a magnetic head having improved characteristics and maintaining a prescribed gap depth.

According to an aspect of the invention there is provided a method of manufacturing a magnetic head comprising the steps of preparing a magnetic ring core composed of a first half provided with a groove for providing a prescribed gap depth in the magnetic head and a second half bonded to the first half, forming a slot in a top of a parallelepiped slider of magnetic material, inserting the ring core into the slot in a position wherein a base end is maintained flush with the top of the slider, securing the ring core in the slot in said position, and grinding the slider from a bottom thereof to expose an inserting end of the ring core.

According to another aspect of the invention there is provided a method of manufacturing a magnetic head comprising the steps of preparing a ring core of magnetic material, forming a slot in top of a parallelepiped slider of magnetic material, inserting and securing the ring core into the slot with one side of the ring core being protruded from one side of the slider to produce a head assembly, mounting and securing the head assembly on a base block while the protruded side of the ring core is in contact with a reference plane of a jig, and grinding the slider from a bottom thereof to expose an inserting end of the ring core.

BRIEF DESCRIPTION OF THE DRAWINGS

Further objects and advantages of the invention will be apparent from the following detailed description when read in conjunction with the accompanying drawings in which:

FIG. 4(a) through FIG. 4(i) are explanatory views showing a sequential manner in which a head assembly is prepared, each including a front view on the right and a side view on the left;

DESCRIPTION OF THE PREFERRED EMBODIMENT

Figure 1A:
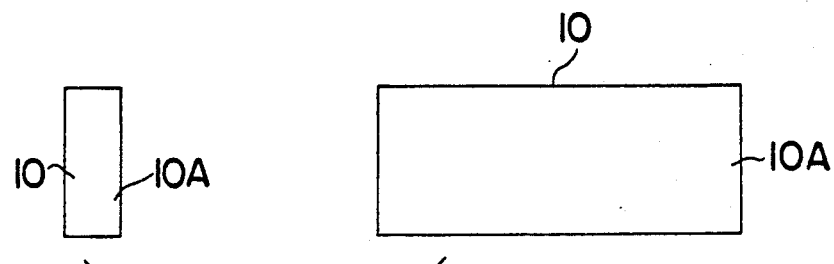
FIG. 1(a) through FIG. 1(e) are explanatory views showing a sequential manner in which an L-side core block is processed, each including a front view on the right and a side view on the left.
Figure 1B:
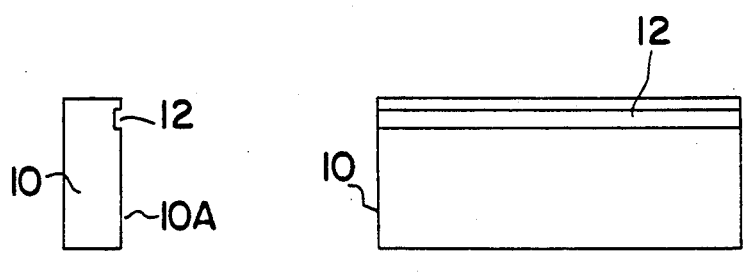
Figure 1C:
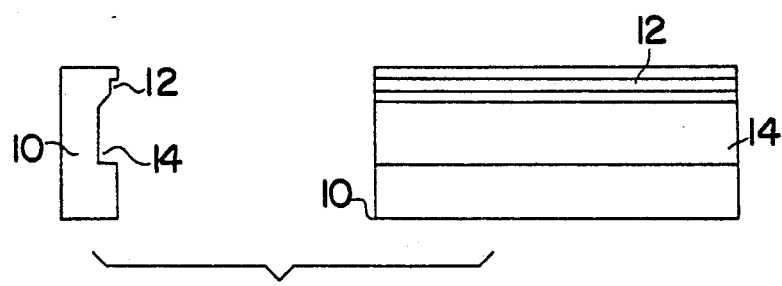
Figure 1D:
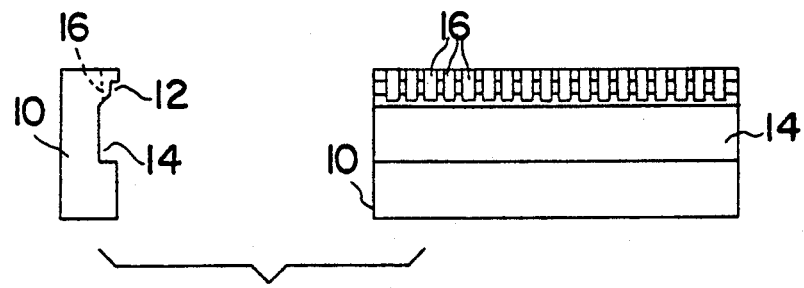
Figure 1E:
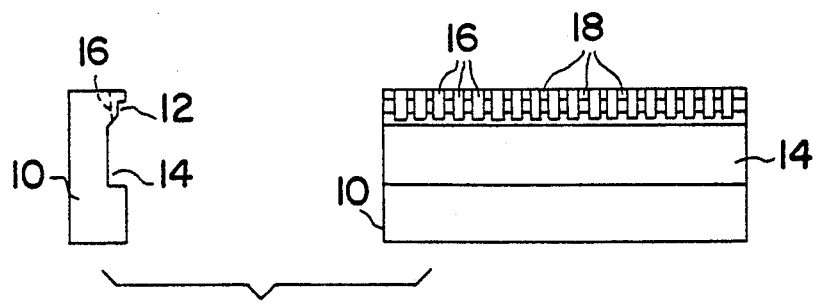

A first core block of magnetic material such as ferrite for use as a L-side half of a magnetic core of the head in the embodiment illustrated will be processed in the following steps of FIG. 1(a) to FIG. 1(e). The core block is first shaped into a parallelepiped block 10 of predetermined size and dimension as shown in FIG. 1(*a*). This can be carried out by using a cutting machine generally referred to as a dicing saw having a fine-toothed grinding wheel (not shown) rotating at a high speed. Next, as seen in FIG. 1(*b*), a groove 12 of a predetermined depth is formed on one side 10*a* of the first core block 10 to extend over the entire length, a predetermined distance from the top edge of the block 10. More particularly, a fine-toothed grinding wheel which may be the same as that used in cutting and shaping of the ferrite material into the block 10 is rotated at a high speed while being in contact with the block 10 which is, in turn, moved in the lengthwise direction at relatively a low speed.

Next in FIG. 1(*c*), the block 10 is then subjected to a step of forming a recess 14 on the same side including the groove 12. When forming the recess 14, relatively a large quantity of the block material should be rasped off. Not so much working accuracy will be required and the recess 14 may have some dimensional errors. Therefore, the recess 14 may be formed with a rough-toothed grinding wheel to improve the working efficiency, in which case corner portions of the block 10 could often be destroyed or broken off during working since the block 10 is made of a brittle material. In accordance with the embodiment, the groove 12 is beforehand formed to leave a predetermined distance from the upper edge of the block 10 and the recess 14 is then formed in such manner that the upper end thereof terminates and merged in the groove 12, as particularly seen in FIG. 1(*c*). Even if there arises a crack at the corner portion of the block 10 in the step of FIG. 1(*c*), a predetermined distance between the upper edge of the block 10 and the groove 12 may be maintained. This feature is the subject matter of U.S. Ser. No. 07/291,540 filed on Dec. 29, 1988 but has no direct concern with this invention so that no further description in this respect will be required.

The block 10 provided with the recess 14 having the upper edge portion merged into the groove 12 will then be subjected to the next step of FIG. 1(*d*) in which a plurality of track grooves 16 are formed on the upper edge portion of the processed side 10*a*. The track grooves 16 may be processed by employing a rotating wheel (not shown) which is intermittently brought into contact at the block 10 with a predetermined angle with respect to the reference face 10*a*, while moving the block 10 in the lengthwise direction at relatively a low speed. Between two adjacent track grooves 16 there is provided a predetermined interval which will correspond to a track width of a finished magnetic head core. The track width will be made different for reading and writing head, for example 0.22 mm for a reading head and 0.45 mm for a writing head.

Next in FIG. 1(*e*), gap materials 18 of predetermined thickness are adhered by any suitable means to upper portions which remain unprocessed on the side 10*a* of the block 10 above the groove 12 and between the adjacent two track grooves 16. The gap material 18 may be a glass material consisting essentially of $SiO_2$ and having a melting point substantially higher than 500° C. The gap material has a thickness of the order of 0.7 $\mu$ for the reading head and 1.8 $\mu$ for the writing head. In the illustrated embodiment, the gap materials 18 are placed on alternate unprocessed portions in order to improve gap accuracy. In another case, the gap materials may be adhered only to two of the unprocessed portions positioned on the opposite ends. Furthermore, the gap materials may be placed on unprocessed portions at every third place.

Figure 2A:
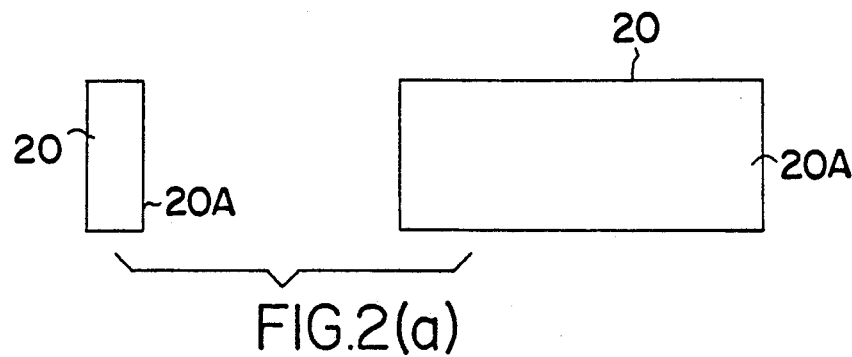
FIG. 2(a) through FIG. 2(c) are explanatory views showing a sequential manner in which an R-side core block is processed, each including a front view on the right and a side view on the left.
Figure 2B:
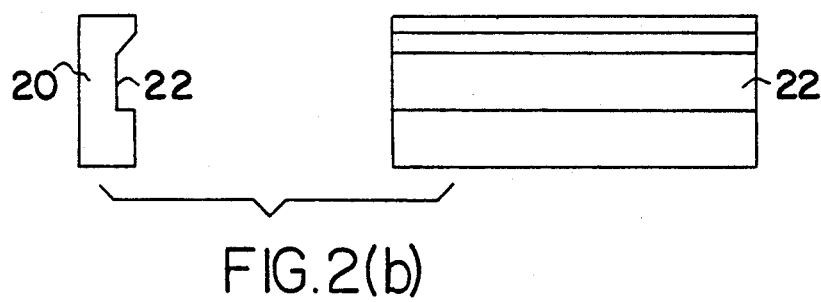
Figure 2C:
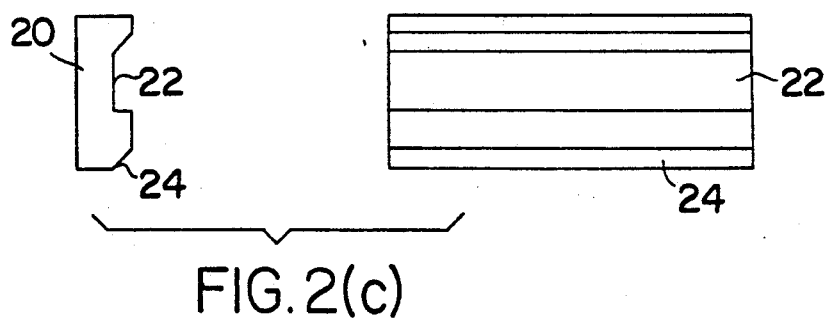

Another half, R-side ferrite core block 20 is processed in a sequential manner as shown in FIG. 2(*a*) through FIG. 2(*c*). The block 20 prepared as shown in FIG. 2(*a*) having configuration and shape identical to the L-side core block 10 is processed to form a recess 22 extending along the entire length of one side 20*a* of the block 20. This can be achieved in substantially the same manner as in the step of forming the recess 14 in the L-side block 10. The recess 22 of the R-side block 20 will be in an opposite relationship to the recess 14 of the L-side block 10 when both blocks are assembled together. Then, as shown in FIG. 2(*c*), the lower edge of the processed side 20*a* is cut away to form a lower inclined surface 24 extending in the lengthwise direction. The recess 22 and the inclined surface 24 may be simultaneously formed by using a single grinding wheel (not shown) which is rotating at a high speed while being in contact with the block 20 moving in the lengthwise direction at a low speed.

FIG. 3(*a*) through FIG. 3(*f*) show the succeeding steps in which the L-side block 10 and the R-side block 20 are assembled into a head block 34 and a plurality of ring cores 42 are produced from the head block 34. More particularly, the blocks 10 and 20 are placed upside down from their position shown in the preceeding drawings and supported under pressure by a jig (not shown) in an opposed relationship. In this opposed condition, as shown in FIG. 3(*a*), a plain portion of the side 10*a* remains unprocessed above the recess 14 and a plain portion of the side 20*a* remains unprocessed between the recess 22 and the inclined surface 24 will be tightly in contact with each other. A first glass rod 30 is placed into a lengthwise extending V-shaped groove formed between the side 10*a* and the inclined surface 24. Also, the gap materials 18 attached to the lower unprocessed portion of the side 10*a* and a lower plain portion of the side 20*a* remained unprocessed below the recess 22 will be in close contact with each other. A second glass rod 32 is inserted within a center hole formed by cooperation of the recesses 14 and 22. These first and second glass rods 30 and 32 are both made of glass material consisting essentially of $SiO_2$ and having melting point substantially lower than 500° C. The glass rods 30 and 32 extend over the entire length of the blocks 10 and 20.

The block assembly shown in FIG. 3(*a*) is treated in an electric furnace at 500° C. for 1 hour so that the glass rods 30 and 32 of glass material having lower melting point will be melted. Thus, the V-shaped groove is filled with the melted glass material 30' of the first rod 30, whereas the melted glass material 32' of the second rod 32 will flow into respective track grooves 16 and also into respective gaps formed between the unprocessed lower plain portions of the side 10*a* and of the side 20*a*. The melted glass material 32' will be enough to fill the center hole to a certain level, as shown in FIG. 3(*b*). After the melted glass material 30' and 32' have been cooled and solidified, the L-side and R-side blocks 10 and 20 are unified into one body to form the head block 34 shown in FIG. 3(*b*). The gap materials 18 of higher melting point will not melt during this heating step in the electric furnace of 500° C.

Figure 3A:
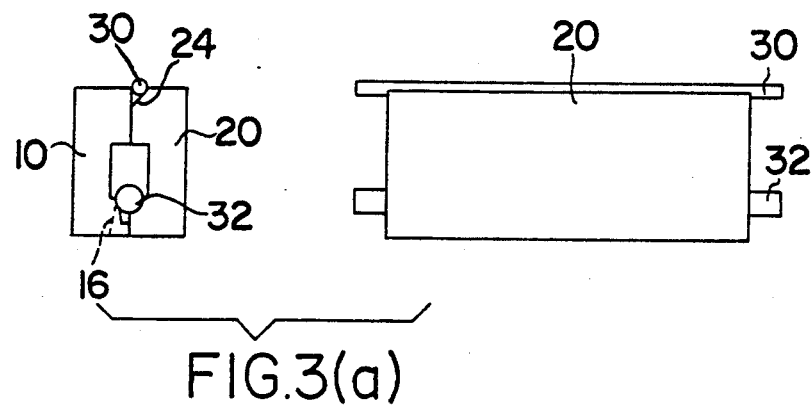
FIG. 3(a) through FIG. 3(f) are explanatory views showing a sequential manner in which a plurality of ring cores are prepared from the L-side and R-side core blocks, each including a front view on the right and a side view on the left.
Figure 3B:
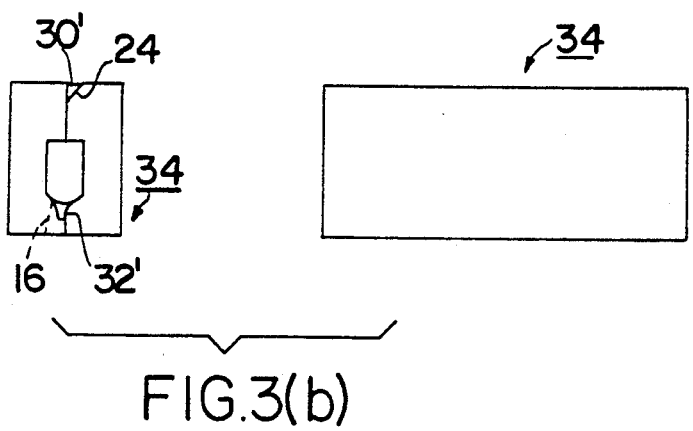
Figure 3C:
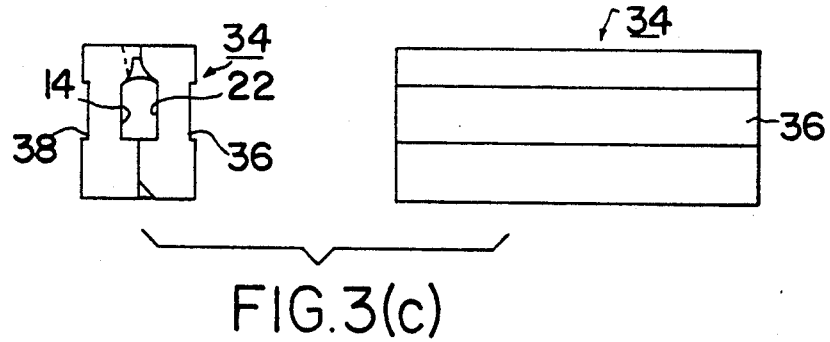

The head block 34 thus prepared is again placed upside down and then processed by a grinding wheel (not shown) to form recesses 36 and 38 on opposite sides thereof in position corresponding to the recesses 22 and 14 respectively, as shown in FIG. 3(c). In general, the reading head has two recesses 36 and 38 as in the embodiment illustrated and the writing head has only one recess 38 formed on the left side of the head block 34.

Figure 3D:
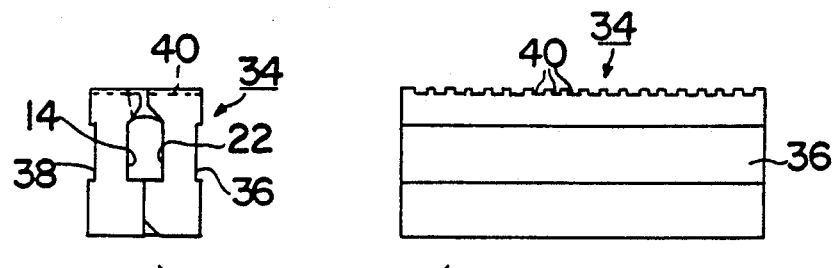

Then in FIG. 3(d), the melted glass material 32' filled in the track grooves 16 is ground to a certain depth to form grooves 40 extending over the entire width of the head block 34. Since the grooves 40 are formed just within the track grooves 16, predetermined intervals between the adjacent two track grooves 16 will not be jeopardized by the grooves 40. The grooves 40 will have important meaning when a ring core is inserted into a slider to be described later.

Figure 3E:
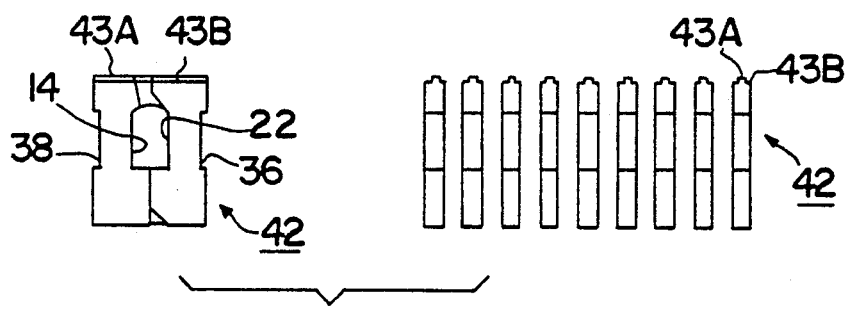

Then in FIG. 3(e), the head block 34 is cut at center of the respective track grooves 16 and the grooves 40 to produce alternately a plurality of ring cores 42 of uniform thickness. Rings provided with the gap materials 18 at the top thereof will not be used as ring cores 42, since the gap materials 18 has a hardness different from the ferrite blocks 10 and 20 and may tends to be broken off. Pieces remaining at both ends of the head block 34 will not meet a prescribed dimensional requirement and therefore go into the discard. As shown, the ring core 42 is provided at the upper edge with a central protrusion 43A of a width identical to the predetermined interval between the track grooves 16 (FIG. 1(d)) and a pair of shoulder portions 43B at opposite sides of the central protrusion 43A.

Figure 3F:
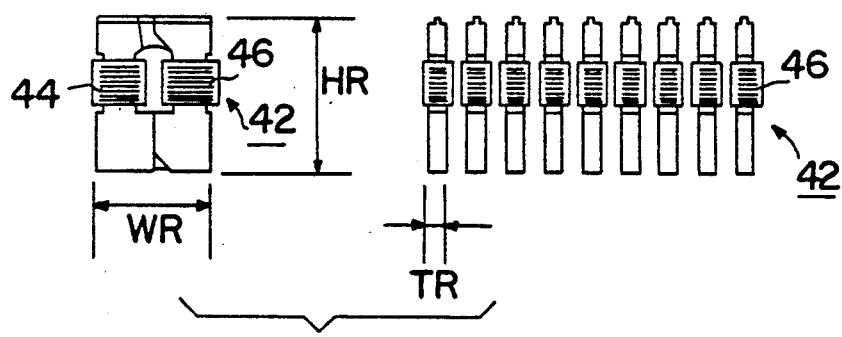

Next in FIG. 3(f), insulated conductive wires 44 and 46 are coiled around both narrow neck portions, one formed by the recesses 14 and 38 and the other by the recesses 22 and 36. While in the illustrated embodiment the conductors 44 and 46 are coiled 30 times respectively with a view to producing a reading head, in the case of a writing head two insulated conductor wires are coiled together 10 times, for example, between the recesses 14 and 38. Each ring core 42 has a width (WR), a height (HR) and a thickness (TR).

Figure 4A:
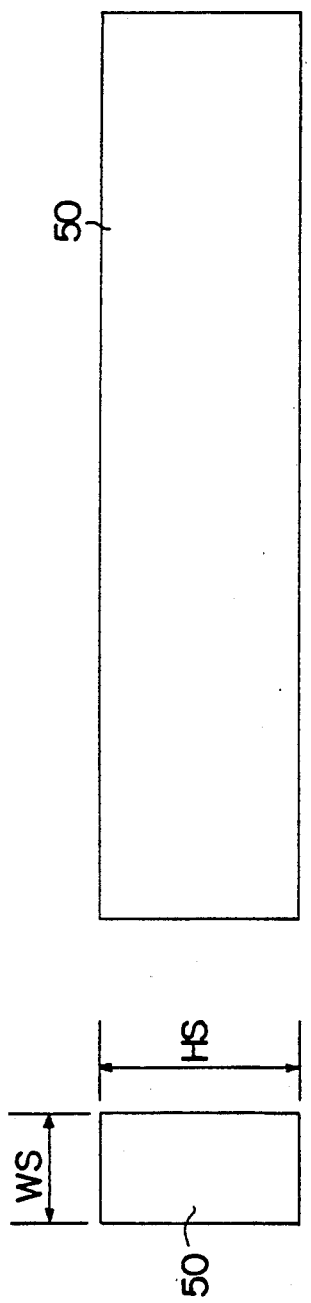
Figure 4B:
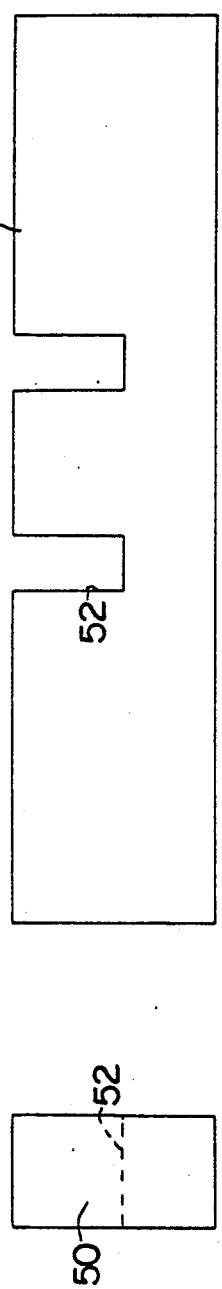
Figure 4B:
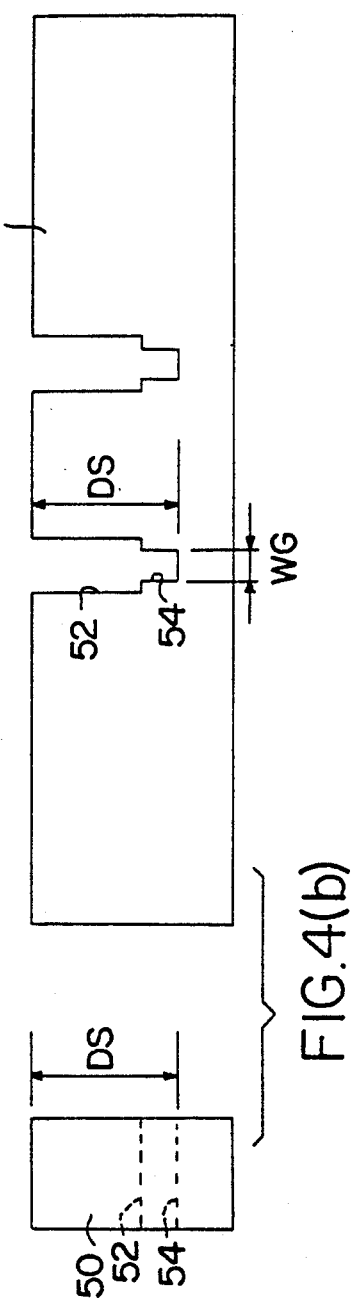
Figure 4H:
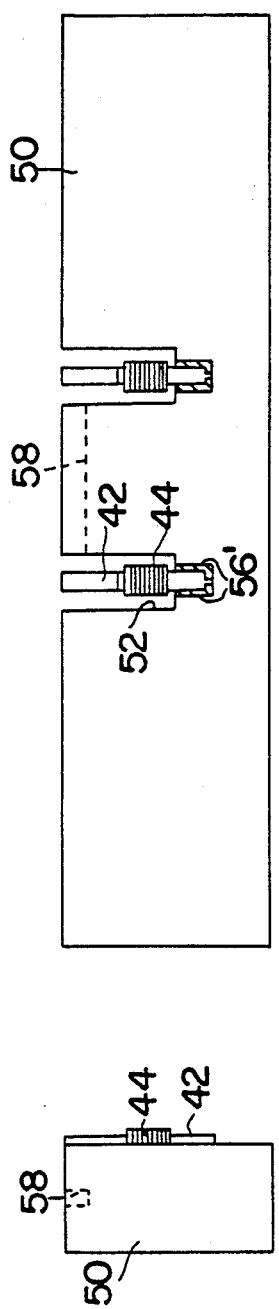
Figure 4I:
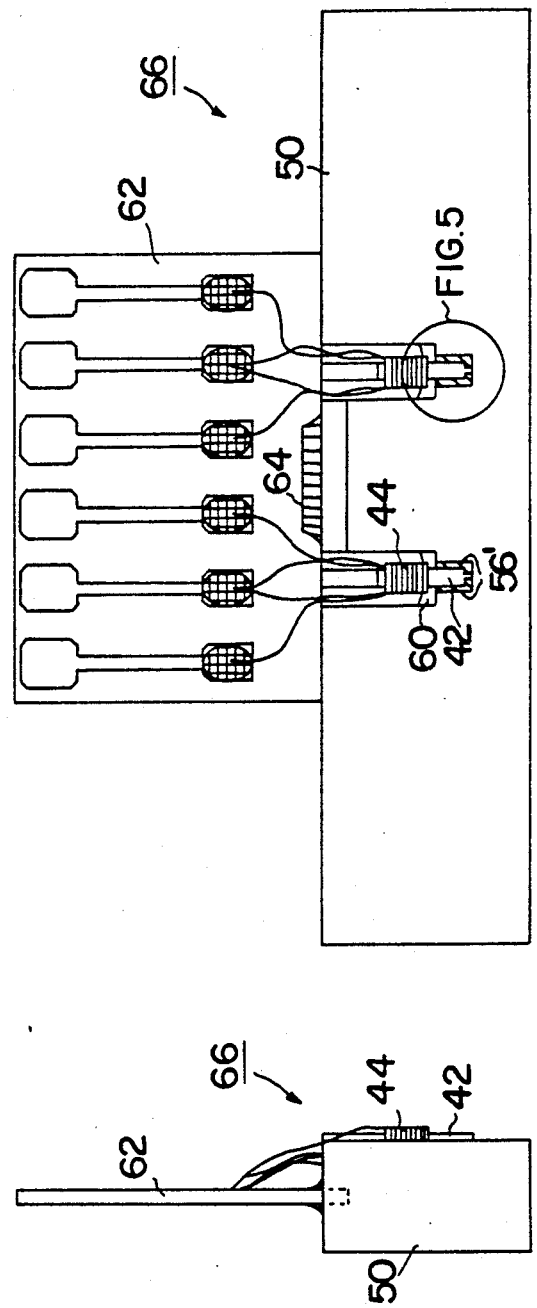

Two ring cores 42 thus coiled are inserted into a slider 50 to produce a 2-channel head assembly. The slider 50 is processed in the following steps as shown in FIG. 4(a) through FIG. 4(i). More particularly, the slider 50 is first prepared as a parallelepiped block of a ferrite material, like the ring core 42, having a width (WS) identical to the ring core width (WR) and a height (HS) considerably larger than the ring core height (HR). The block is processed to cut a pair of slots 52 to a certain depth in the step of FIG. 4(b) and then, as seen in FIG. 4(c), the bottom of the respective slots 52 are further cut to form narrower grooves 54, respectively. The depth of the slot 52 is not limited but a depth (DS) from the top of the slider 50 to the bottom of the groove 54 should be identical to the height (HR) of the ring core 42. The width (WG) of the groove 54 will be somewhat larger than the ring core thickness (TR), for example by 100~200 μ.

Glass rods 56 extending over the entire width (WS) of the slider are respectively inserted within the grooves 54, as can be seen in FIG. 4(d). The glass rods 56 may be of the same material as the glass rods 30 and 32 having a relatively low melting point. Then, the slider 50 is introduced into an electric furnace of a temperature sufficiently higher than the melting point of the glass rods 56 so that the grooves 54 are filled with melted, and then solidified glass material 56' of the glass rods 56 (FIG. 4(e)). The solidified glass material 56' filling in the grooves 54 will then be substantially removed by employing grinding wheels (not shown) of a thickness identical to the ring core thickness (TR), thereby forming channels 54A. At opposite sides of the channels 54A, the glass material 56' will be left as thin layers each having a thickness of about 50~100μ.

A channel 58 is formed on the top of the slider 50 between the slots 52 as in FIG. 4 (g), and then the coiled ring cores 42 in the headstanding condition are inserted into the respective slots 52 and grooves 54 as in FIG. 4 (h). The center protrusion 43A of the ring core 42 is in contact with the bottom of the channel 54A and the upper edge lies on the same plane as the top of the slider 50. Although the ring core 42 and the slider 50 have the same width, as best seen in the side view of FIG. 4 (h), the ring cores 42 are somewhat offset with respect to the slider 50 in the breadthwise direction so that the side periphery of the L-side core block 10 is protruded by about 0.2 mm from the corresponding side of the slider 50. The ring cores 42 are held in such position and secured to the slider 50 by means of adhesive 60 of epoxy resin or any other suitable type. A printed circuit board 62 is inserted into the channel 58 and secured to the slider 50 with suitable adhesive 64 such as epoxy resin. Thereafter, wiring is made between the ring cores 42 and the circuit board to produce a 2-channel head assembly 66 as shown in FIG. 4 (i).

Figure 5:
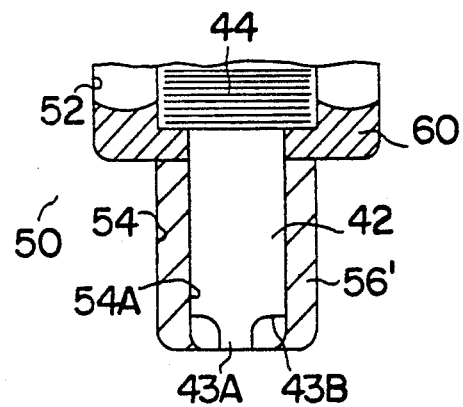
FIG. 5 is a view showing a portion in a circle in the front view of FIG. 4(i) on a magnified scale.

Positional relation of the ring core 42 with respect to the slider 50, particularly to the groove 54 and the channel 54A, in the head assembly 66 is exaggerated in FIG. 5. Since the ring core 42 and the slider 50 are produced by mechanical working especially by employing grinding wheels, each corner portion should be rounded and should not provide a definite right angle. In the illustrated embodiment, however, the shoulder portions 43B (FIG. 3e) will be act as exceptions or alternative means for the rounded corners which should otherwise have inevitably been produced on the bottom edge of the channel 54A. The center protrusion 43A of a narrower area may therefore be in complete contact with the bottom of the channel 54A, meaning that the upper edge of the ring core 42 may be kept flush with the top of the slider 50.

Figure 6A:
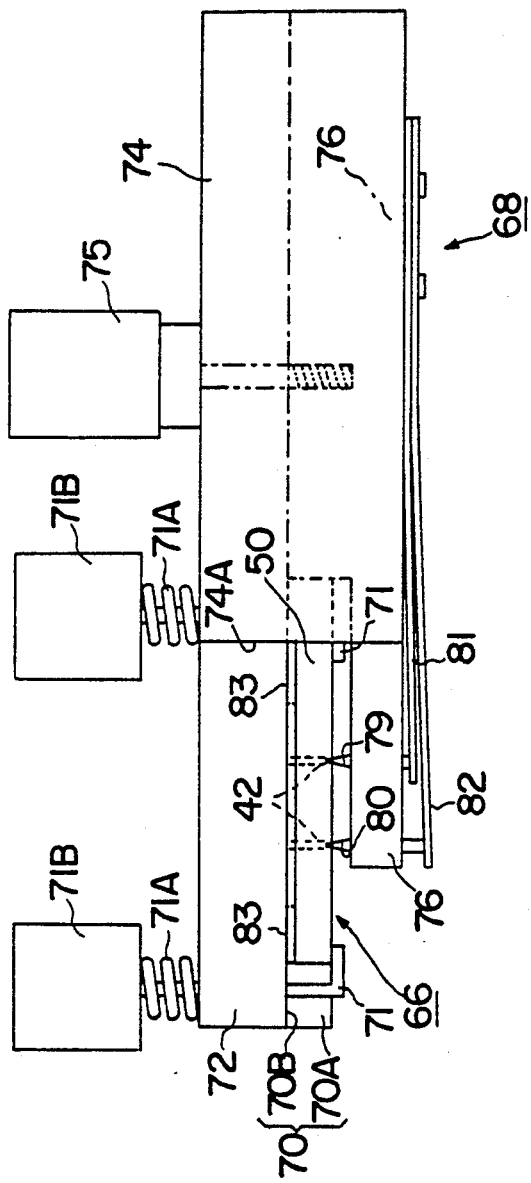
FIG. 6(a) through FIG. 6(c) are plan view, front view and sectional views taken along line C-C in FIG. 6(b) showing a manner in which two ring cores are positioned in a slider with a jig, particularly in the step shown in FIG. 4(h)
Figure 6B:
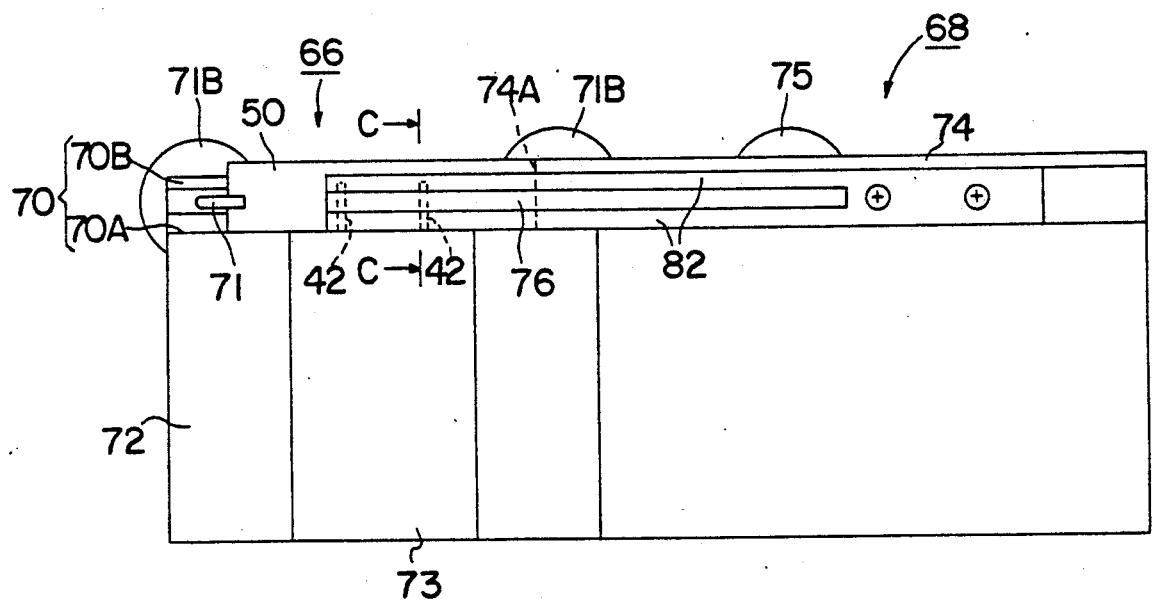
Figure 6C:
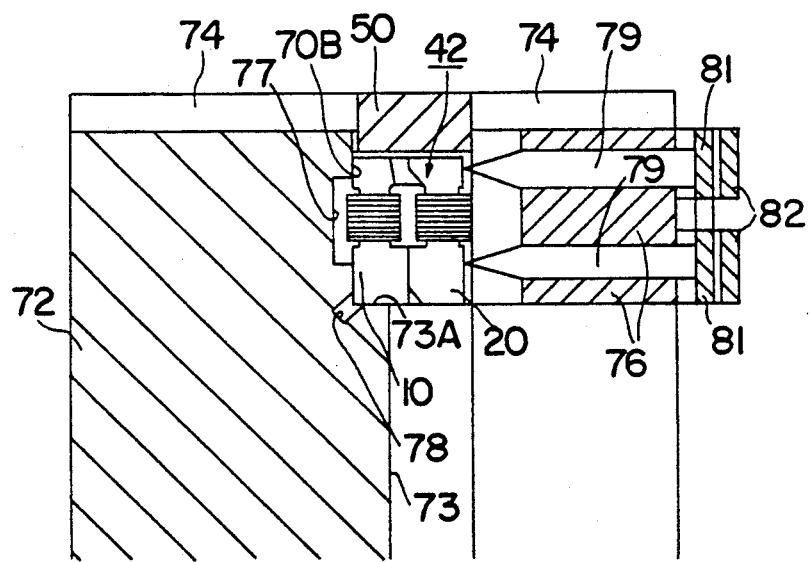

The ring cores 42 should be held in such position as shown in FIG. 4 (h) and FIG. 5 until they are secured to the slider 50 with the adhesive 60 in the step of FIG. 4 (i). Such positioning of the ring cores 42 can be achieved by means of a jig 68 shown in FIG. 6 (a) through FIG. 6 (c). The jig 68 comprises a parallelepiped base block 72 provided with a step 70 extending over the entire length thereof and including a horizontal support 70A and a upstanding wall 70B, an upper plate 74 covering a rear portion of the base block 72, and a lever 76 secured by a screw 75 to the base block 72 in a position interposed between the step 70 and the upper plate 74. A front portion of the base block 72 not covered with the upper plate 74 will extend sufficiently further than the entire length of the head assembly 66. At the front portion, the base block 72 is provided with a partial recess 73 which retracts a front edge of the horizontal support 70A toward the upstanding wall 70B. The horizontal wall 73A at the recess 73 is narrower than a half of the ring core width (WR). The recess 73 extends sufficiently to accomodate the ring cores 42 fixedly positioned in the head assembly 66. The upstanding wall 70B have recess 77 and the corner portion between upstanding wall 70B and horizontal wall 73A is provided with recess 78. Both recesses 77 and 78 are respectively extending lengthwise similarly to the recess 73. A pair of arms 71 extend through the step 70 to clamp therebetween the slider 50 placed in position in the jig 68. Clamping action may be released by pushing heads 71B against biasing force of springs 71A coiled between the heads 71B and the base block 72.

The lever 76 extends leftwardly from the upper plate 74. In the exposed region, between the lever 76 and the upstanding wall 70B of the step 70 is provided a gap slightly larger than the ring core width (WR), that is the same as the slider width (WS), by 1~2 mm for example. To the outer surface of the lever 76 are attached a pair of split leaf springs 81 and 82. A pair of pins 79, 79 and 80, 80 extending through the lever 76 are biased toward the base block 72 by the leaf springs 81 and 82, respectively. The pins 79 and 80 are spaced apart to correspond the distance between the ring cores 42, 42 in the head assembly 66 and therefore will be just in alignment with the ring cores 42, 42 when the slider 50 is placed in position in the jig 68.

The slider 50 into which two ring cores 42, 42 are inserted in such manner as shown in FIG. 4 (h) is placed upside down onto the jig 68. By pushing the heads 71B, 71B against the springs 71A, 71A to move the arms 71, 71 far away from the base block 72, the slider 50 is placed on the horizontal wall 73A with the one side being in contact with a lefthand edge 74A of the upper plate 74. The heads 71B, 71B are then released to clamp the slider 50 between the arms 71, 71, with a pair of spacers 83, 83 having a thickness of 0.2 mm, for example, being interposed between the upstanding wall 70B and the slider 50, so that the slider 50 may be maintained in a definite position. In this position, the ring cores 42, 42 are displaced breadthwise with respect to the slider 50 by pointed ends of the pins 79 and 80, as particularly seen in FIG. 6 (a) and FIG. 6 (c). The recess 77 acts as a retreat for the coils provided around the protruding L-side blocks 10 of the ring cores 42, 42. The recess 78 will allow the protruded sides of the ring cores 42, 42 to become in flush contact with the upsatanding wall 70B, which might otherwise be affected by a round corner between the horizontal support 70A and the upstanding wall 70B which would inevitably be produced by normal mechanical working of the step 70. While maintaining such cramped condition of the slider 50 and the ring cores 42, 42, the ring cores may be secured in position to the slider 50 by incorporating the adhesive 60 which is then solidified. The ring cores 42, 42 are supported on the horizontal wall 73A at the recess 73 with one side of each being in contact with the upstanding wall 70A, which will function only to the L-side blocks 10. The R-side blocks 20 are suspended in midair in the recess 73. If the R-side block 20 should have been secured to the L-side block 10 with a slight slip-down relative to the latter, the ring core 42 is positioned in the slider 50 with reference only to the L-side block in which a predetermined distance is provided between the upper edge and the groove 12, so that a prescribed gap depth in the magnetic head may be maintained with high precision.

Figures 7A, 7B:
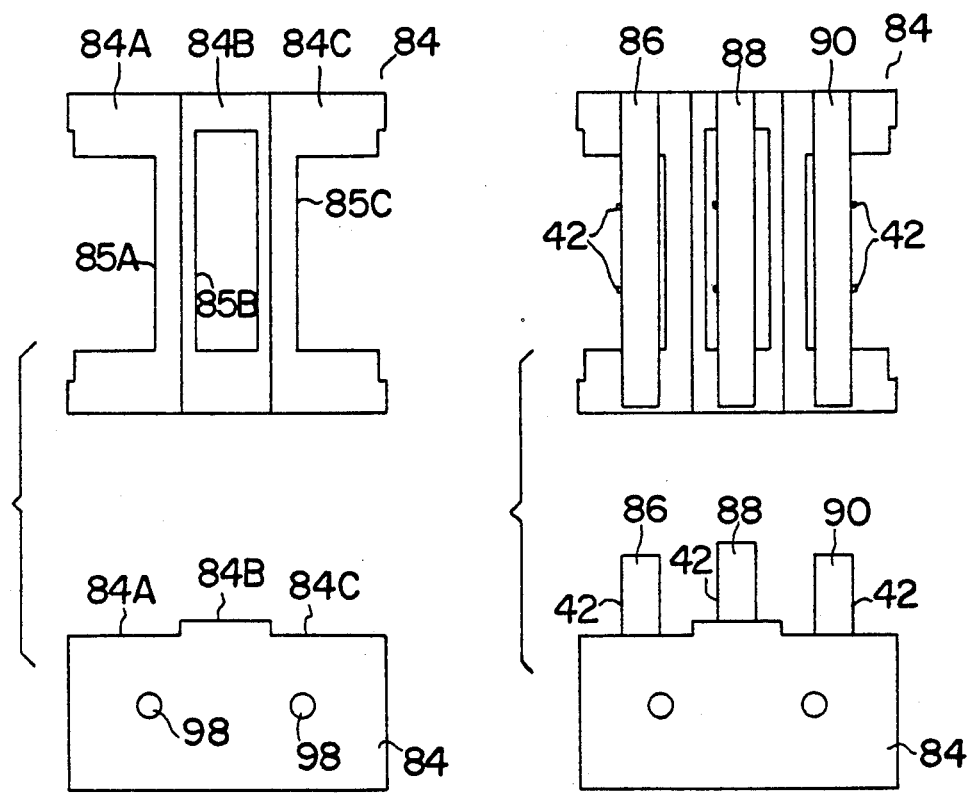
FIG. 7(a) through FIG. 7(d) are views showing a sequential manner in which three head assemblies are mounted on a base block to produce a composite magnetic head of a write/read/write type, each including a plan view on the top and a front view on the bottom.
Figure 7C:
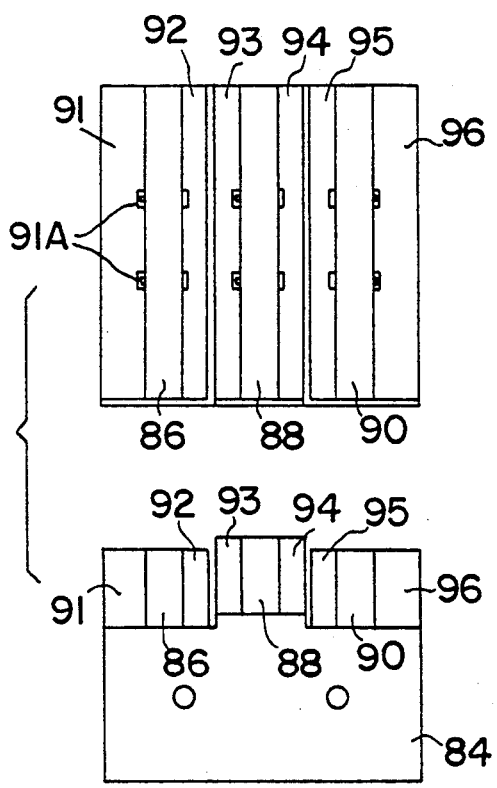
Figure 7D:
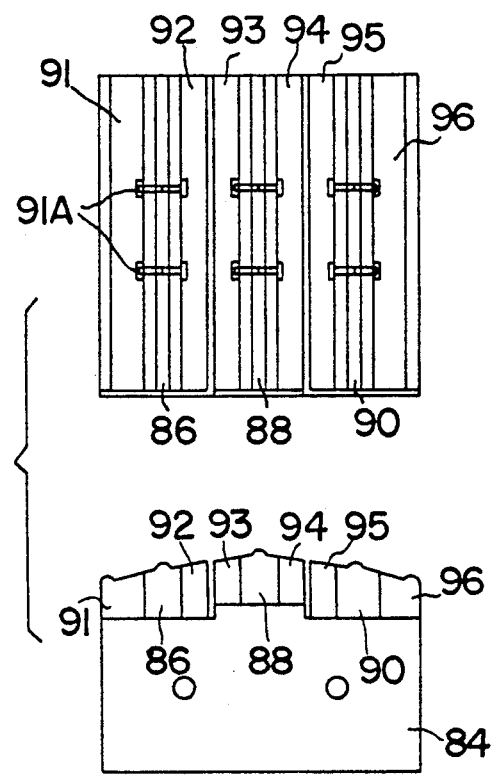

In the illustrated embodiment, a write/read/write type magnetic head comprising two writing heads and one reading head each prepared substantially by the foregoing process in the form of the head assembly 66 shown in FIG. 4 (i) is to be manufactured by mounting the respective head assemblies on a base block, attaching guard blocks and/or shield blocks on the opposite sides of the respective head assemblies and by grinding the respective head assemblies from the tape contact sides thereof to expose the ring cores fitted therein, as shown in FIG. 7 (a) through FIG. 7 (d). The base block 84 made from a diecasting aluminum alloy is shaped to a configuration shown in FIG. 7 (a) providing first to third pedestals 84A to 84C, which are adapted to support thereon a first writing head assembly 86, a reading head assembly 88 and a second writing head assembly 90, respectively, as shown in FIG. 7 (b). The reading head assembly 88 is substantially identical to the 2-channel head assembly 66 prepared by the succeeding steps of FIG. 1 (a) through FIG. 4 (i) and includes a pair of ring cores each provided with coils on both sides thereof (only one of which can be seen in FIG. 7 (b) because the ring cores are breadthwise offset with respect to the slider). The writing head assemblies 86 and 90 are different from the head assembly 66 in that the coils are provided on one side, that is the L-side blocks 10 of the respective ring cores. The writing head assemblies 86, 90 are mounted on the pedestals 84A and 84C in such manner that the coils 42, 42 are positioned on opposite sides across the reading head assembly 88, which will be a preferable arrangement for preventing cross-feed. The respective pedestals 84A to 84C has recesses or openings 85A to 85C respectively for accommodating the printed circuit boards 62 (FIG. 4 (i)) extending from the slider 50.

Next in FIG. 7 (c), to the first writing head assembly 86 secured on the first pedestal 84A are bonded a guard block 91 at the outer face and a shield block 92 at the inner face. Symmetrically, a guard block 96 and a shield block 95 are bonded to respective mirror image sides of the second writing head assembly 90 mounted on the third pedestal 84C. To both sides of the reading head assembly 88 on the second pedestal 84B are bonded shield blocks 93 and 94. These blocks are all made from ferrite which is identical to the head assembly material. These blocks are provided with recesses 91A for receiving the coils protruding from the sides of the respective head assemblies. It should be noted that there are provided gaps between the adjacent shield blocks 92 and 93; 94 and 95, whereby shield characteristics may further be improved by air layers in the gaps. Then in FIG. 7 (d), the head assemblies secured in position onto the base block 84 are ground from the tape contact side by means of suitable grinding wheels, and then the surface is mirror-finished by lapping tapes. A pair of side plates and a back plate (all not shown) are attached to the opposite sides and the backside of the base block 84 so that the 2-channel, write/read/write type magnetic head will be prepared at last. The magnetic head is may be attached to an associated instrument (not shown) by screw means (not shown) extending through threaded holes 98 formed in the base block 84.

Figure 8A:
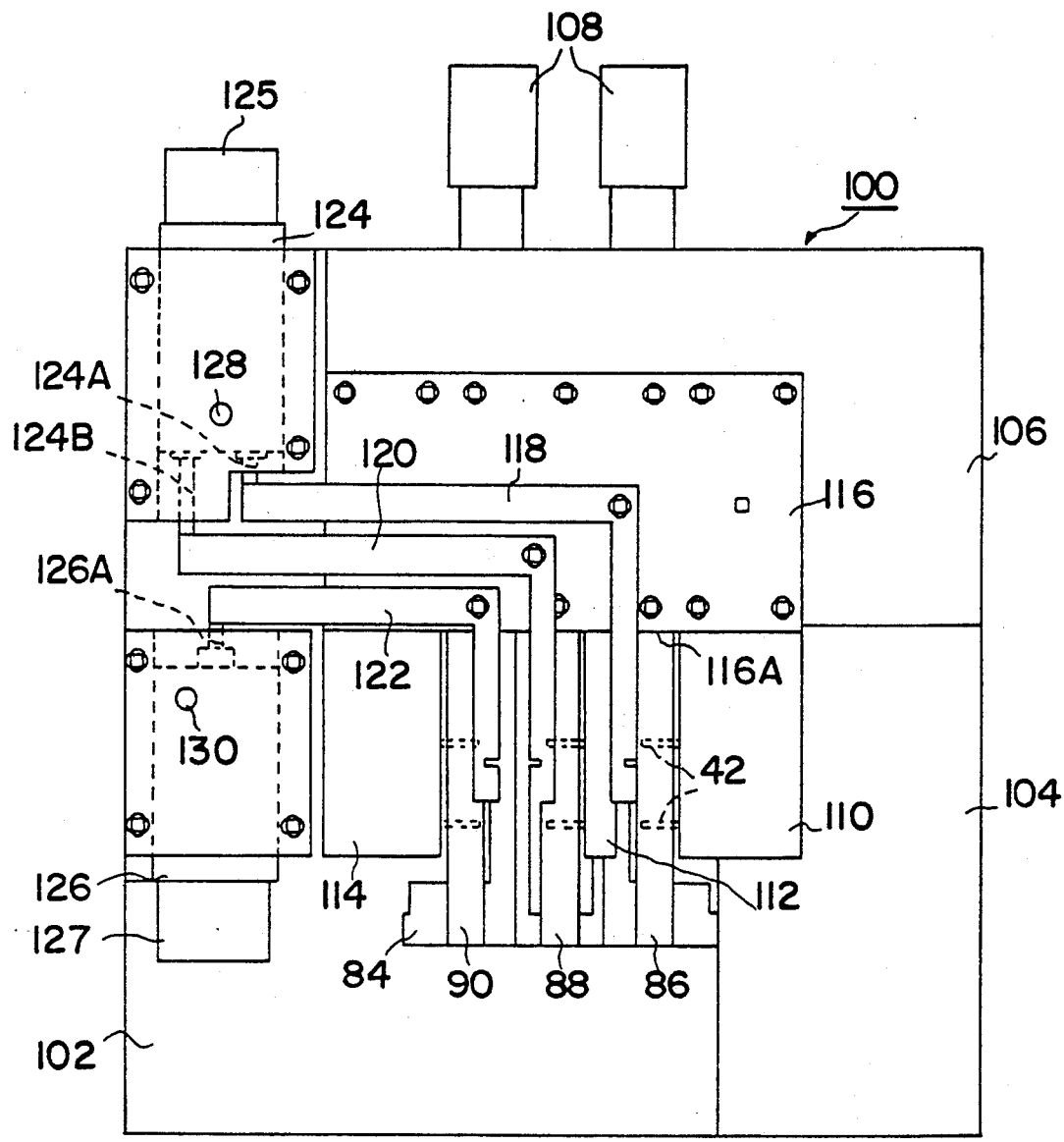
FIG. 8(a) and FIG. 8(b) are plan and front views showing a manner of positioning the head assemblies on the base block, particularly in the step shown in FIG. 7(b).
Figure 8B:
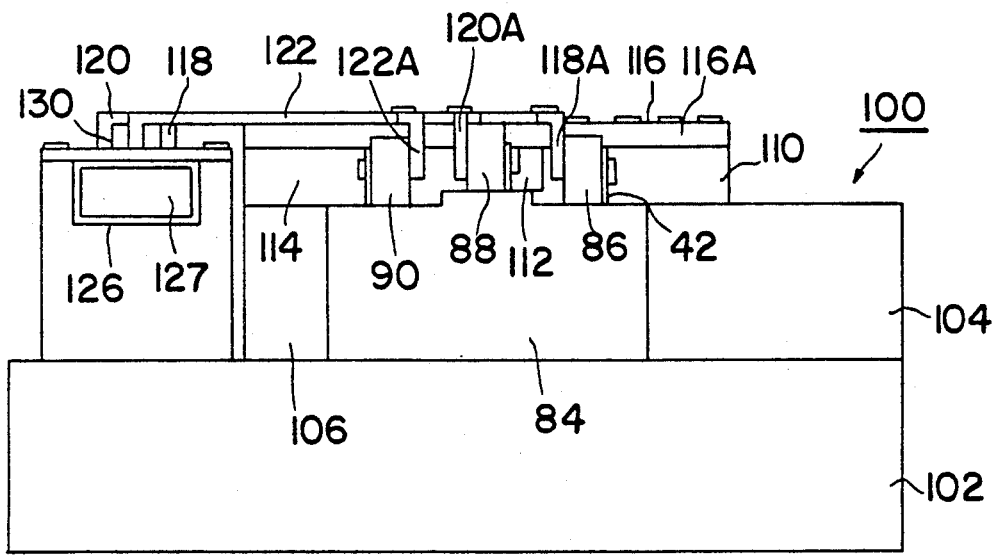

A preferable construction of a jig to be used in the step of FIG. 7 (b) for positioning the respective head assemblies 86, 88 and 90 on the respective pedestals 84A to 84C of the base block 84 is illustrated in FIG. 8 (a) and FIG. 8 (b). The jig 100 includes a base 102 providing a horizontal for supporting thereon the base block 84. A pair of parallelepiped base block positioning blocks 104 and 106 are secured onto the base 102 to provide two reference walls at a right angle to one another for positioning the base block 84 placed on the base 102. To the second block 106 are secured first to third reference blocks 110, 112, 114 and a slider positioning block 116. The reference blocks 110, 112, 114 extends forward from the slider positioning block 116.

First to third press levers 118, 120, 122 are pivotably supported on the slider positioning block 116 and extends substantially in parallel with the reference blocks 110, 112, 114 respectively. The levers 118 and 120 may be rotated at the same time in the counterclockwise direction by actuating a head 125 of a cylinder 124 to extend pins 124A, 124B. Similarly, the lever 122 may be rotated in the clockwise direction by a pin 126A which is extended by a head 127 of another cylinder 126 mounted on the base 102 in opposition to the cylinder 124. The cylinder heads 125, 127 are normally retained in retracted positions by means of lock ball means 128, 130.

With the jig 100 having the above described construction and arrangement, the base block 84 is mounted on the horizontal of the base 102 in a position determined by flush contact between two adjacent sides thereof and the reference walls provided by the blocks 104, 106. The base block 84 is secured in this position by screw means 108 extending through the block 106 and screwed into the threaded holes 98 of the base block 84. Then, the first writing head assembly 86, the reading head assembly 88 and the second writing head assembly 90, to bottoms of which has been applied adhesive agents, are placed on the respective pedestals 84A, 84B and 84C. Between the reference blocks 110, 112, 114 and downward projecting walls 118A, 120A, 122A of the press levers 118, 120, 122, there respectively provided spaces slightly larger than the thickness of the head assemblies 86, 88, 90. The head assemblies 86, 88, 90 can easily be inserted into the respective spaces until one side edges of the sliders become into flush contact with the front wall 116A of the slider positioning block 116. In this position, the protruded sides of the ring cores 42 are substantially in contact with the reference blocks 110, 112, 114 whereas at the opposite sides the side walls of the sliders 50 are substantially in contact with the press levers 118, 120, 122. Then, the cylinder heads 125 and 127 are actuated to get closer to each other to rotate the press levers 118 and 120 in the counterclockwise direction and the press lever 122 in the clockwise direction, so that the respective head cores 86, 88, 90 may be clamped in definite position between the reference blocks and the press levers. The cylinder heads 125 and 127 can be actuated at the same time by one action with a thumb and another finger.

While the invention has been described in detail in conjunction with a particular embodiment thereof, it is to be understood that many modifications and variations may be made without departing from spirit and scope of the invention as defined in the appended claims.

What is claimed is:

1. A method of manufacturing a magnetic head comprising the steps of:

preparing a magnetic ring core composed of a first half provided with a first groove for defining a prescribed gap depth in said magnetic head and a second half bonded to said first half;

forming a slot extending from a top surface of a parallelepiped slider of magnetic material;

inserting said ring core into said slot such that a base end of said first half of the ring core is in contact with a reference horizontal plane of a jig, with a base end of said second half of the ring core being separated from the reference horizontal plane of the jig;

securing the ring core in said slot in said position; and grinding the slider from the bottom surface thereof opposite to the top surface to a predetermined level so that a leading end of the ring core positioned deep in said slot is exposed.

2. The method according to claim 1 wherein said slot is formed by grinding said slider from the top surface thereof to a depth identical to a height of said first half, and said leading end of the ring core includes a breadthwise extending protrusion and a pair of recessed shoulders formed on opposite sides of said protrusion, said recessed shoulders relieving corners which otherwise should have been formed on bottom edges of said ring core, thereby providing a flush contact between said protrusion and the bottom of said slot.

3. The method according to claim 1 or 2 wherein two or more of said ring cores are inserted and secured in a corresponding number of said slots formed in parallel in said slider.

4. A method of manufacturing a magnetic head comprising the steps of:

preparing a ring core of magnetic material;

forming a slot extending into a top surface of a slider of magnetic material;

inserting and securing said ring core into said slot with one side of said ring core protruding from a corresponding side of said slider, thereby producing a head assembly;

mounting and securing two or more of said head assemblies on a base block in such manner that said protruding side of said ring core in each of said head assemblies is positioned in contact with a reference plane of a jig with the side of the slider being separated from the reference plane; and grinding each slider from a bottom surface opposite to said top surface to a predetermined level, so that a leading end of the ring core positioned deep in said slot is exposed.

5. The method according to claim 4 wherein two or more of said ring cores are inserted and secured in a corresponding number of said slots formed in parallel in said slider.

* * * * *